United States Patent [19]

Shiraishi et al.

[11] Patent Number: 5,854,164
[45] Date of Patent: *Dec. 29, 1998

[54] METHOD FOR PREPARING CATALYST COMPONENT FOR OLEFIN POLYMERIZATION, CATALYST FOR OLEFIN POLYMERIZATION AND PROCESS FOR PRODUCING OLEFIN POLYMER WITH THE CATALYST

[75] Inventors: Hiroyuki Shiraishi; Eiji Nakaishi, both of Ichihara; Takahiro Hino, Ibaraki; Akio Imai, Ichihara, all of Japan

[73] Assignee: Sumitomo Chemical Company, Limited, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 731,439

[22] Filed: Oct. 15, 1996

[30] Foreign Application Priority Data

Oct. 16, 1995 [JP] Japan .................................. 7-267036
Oct. 16, 1995 [JP] Japan .................................. 7-267037

[51] Int. Cl.$^6$ ............................ C08F 4/653; C08F 4/654; C08F 10/00
[52] U.S. Cl. ...................... 502/109; 502/104; 502/115; 502/116; 502/123; 526/119; 526/124.9; 526/348.6
[58] Field of Search ................................. 502/104, 109, 502/115, 116, 123

[56] References Cited

U.S. PATENT DOCUMENTS 4,900,706  2/1990  Sasaki et al. ........................ 526/119
4,916,099  4/1990  Sasaki et al. ........................ 526/119
5,118,768  6/1992  Job et al. .

FOREIGN PATENT DOCUMENTS 0115195    8/1984   European Pat. Off. .
A0206172   12/1986  European Pat. Off. .
63-040804  8/1988   Japan .
03040721   6/1991   Japan .
03050765   8/1991   Japan .
07096571   10/1995  Japan .
2097411    11/1982  United Kingdom .

OTHER PUBLICATIONS

Translation of Japanese 88–233176.

Derwent Abstract of JP 88 233176.

Patent Abstracts of Japan of JP 88 233176.

*Primary Examiner*—Edward J. Smith
*Attorney, Agent, or Firm*—Stevens, Davis, Miller & Mosher, L.L.P.

[57] ABSTRACT

A solid catalyst component (A) for olefin polymerization comprising Mg, Ti, a halogen and a cyclic organic nitrogen compound (C), a solid catalyst comprising the solid catalyst component and an organoaluminum compound, and a process for producing an olefin polymer with the catalyst.

According to the present invention, there can be provided an olefin polymerization catalyst having a high catalyst activity per titanium enough to make the removal of catalyst residues unnecessary and a process for producing an olefin polymer having a low content of low molecular weight component with the catalyst.

13 Claims, No Drawings

METHOD FOR PREPARING CATALYST COMPONENT FOR OLEFIN POLYMERIZATION, CATALYST FOR OLEFIN POLYMERIZATION AND PROCESS FOR PRODUCING OLEFIN POLYMER WITH THE CATALYST

Method for preparing catalyst component for olefin polymerization, catalyst for olefin polymerization and process for producing olefin polymer with the catalyst

1. Field of the Invention

The present invention relates to a method for preparing a catalyst component for olefin polymerization, catalyst for olefin polymerization and a process for producing an olefin polymer. More particularly, the present invention relates to a method for preparing a catalyst component for olefin polymerization and a catalyst for olefin polymerization comprising the solid catalyst component having an extremely high activity per titanium in a gas phase polymerization or slurry polymerization process, and a process for producing an olefin polymer containing a small amount of lower molecular weight components using the catalyst. Further, the present invention relates to a process for producing an olefin polymer having a good flowability which has a high bulk density and contains a small amount of fine powders.

2. Description of the Related Art

It is needless to say that high activity of the catalyst used in production of an olefin polymer, especially high activity per transition metal provides industrially extremely high utility value since it eliminates necessity to remove catalyst residues from the polymer obtained after polymerization and can simplify the production procedures of the polymer.

On the other hand, since a lot of adhesion to a polymerization vessel produces a variety of difficulties in operation and reduces operation efficiency, it is desirable that the adhesion to the polymerization vessel is as little as possible. From the viewpoints of operation stability and operation efficiency, it is desirable that a polymer powder has high bulk density, narrow particle size distribution and excellent flowability. Further, since existence of lower molecular weight components is a factor which controls transparency, impact resistance, blocking property of a film and the like, it is preferable to produce an olefin polymer containing a small amount of lower molecular weight components.

Recently, rapid progress has been made with respect to polymerization activity by combination of a magnesium compound and a titanium compound in the field of catalysts for olefin polymerization (JP-B-47034092(1971), JP-B-47041676(1972), U.S. Pat. No. 4,223,117, GB-B-1,498,862 and the like). However, the olefin polymers produced by using these catalyst systems are not satisfactory in the points of particle property and blocking property.

Further, it is disclosed that a highly crystalline polymer can be obtained with high activity by treatment with an oxygen-containing electron donor or the like such as an ester and the like as an internal donor in stereoregular polymerization of propylene (JP-B-52039431(1977), JP-B-52036786(1977), U.S. Pat. No. 4,412,049, U.S. Pat. No. 4,672,050 and the like). However, the olefin polymers produced by copolymerization of ethylene with α-olefin using these catalyst systems also are not satisfactory in the points of particle property and blocking property as described above.

On the other hand, for reducing lower molecular weight components in the polymerization of ethylene, there are disclosed a catalyst system comprising a solid component obtained by the reaction of a magnesium halide compound with a titanium amide compound and an organic aluminum compound (JP-B-47042037(1972), JP-B-54009154(1979), JP-B-56014686(1981), EP 320169, JP-A-06228223(1994) and the like). However, also when copolymerization of ethylene with an α-olefin is conducted using these catalyst systems, particle property and blocking property are not sufficient yet.

Further, as the other process for reducing lower molecular weight components in the polymerization of ethylene, there are disclosed polymerization processes in which an organoaluminum compound and a cyclic nitrogen containing compound as an external donor are added in polymerization using a solid catalyst comprising a magnesium compound and a titanium compound (JP-A-60212408 (1985), JP-B-06053777(1994), JP-B-06070107(1994), JP-A-06220118(1994) and the like). However, also when copolymerization of ethylene with α-olefin is conducted using these processes, particle property and blocking property are not necessarily sufficient.

SUMMARY OF THE INVENTION

An object of the present invention is to provide a solid catalyst component and catalyst for olefin polymerization having a high catalyst activity per titanium enough to make the removal of catalyst residues unnecessary, and a process for producing an olefin polymer containing a small amount of lower molecular weight component by using the catalyst.

The present inventors have intensively studied about the object for a long period. As the result, the present inventors found a specific solid catalyst component containing a cyclic organic nitrogen compound and accomplished the present invention.

The present invention provides a method for preparing a solid catalyst component (A) for olefin polymerization comprising Mg, Ti, a halogen and a cyclic organic nitrogen compound (C).

Further, the present invention also provides a catalyst for olefin polymerization comprising the solid catalyst component (A) described above and an organoaluminum compound (B), and a process for producing an olefin polymer with said catalyst.

The present invention will be described specifically below.

DETAILED DESCRIPTION OF THE INVENTION

The solid catalyst component (A) prepared in the present invention comprises Mg, Ti, a halogen and a cyclic organic nitrogen compound (C). The cyclic organic nitrogen compound (C) used in the present invention is preferably a 3 to 8-membered cyclic organic nitrogen compound, more preferably a 5 to 6-membered cyclic organic nitrogen compound. Among them, piperidine, pyrrolidine and derivatives thereof are preferable. Piperidine and piperidine derivatives are more preferable. The specific example of piperidine and piperidine derivatives include piperidine, N-methylpiperidine, 2,6-dimethylpiperidine, 3,5-dimethylpiperidine, N-methyl-2,6-dimethylpiperidine, N-methyl-3,5-dimethylpiperidine, 2,2,6-trimethylpiperidine, 2,2,6,6-tetramethylpiperidine, N-methyl-2,2,6,6-tetramethylpiperidine, 2,2,4,6,6-pentamethylpiperidine, 4-acetyloxy-2,2,6,6-tetramethylpiperidine and compounds represented by the following formulae, and the like.

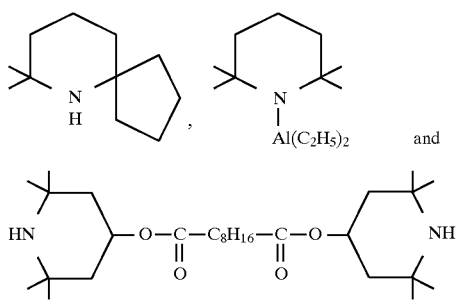

The specific example of pyrrolidine and pyrrolidine derivatives includes pyrrolidine, N-methylpyrrolidine, 2,5-dimethylpyrrolidine, N-methyl-2,5-dimethylpyrrolidine, 3,4-dimethylpyrrolidine, N-methyl-3,4-dimethylpyrrolidine, 2,2,5-trimethylpyrrolidine, 2,2,5,5-tetramethylpyrrolidine, N-methyl-2,2,5,5-tetramethylpyrrolidine and compounds represented by the following formulae, and the like.

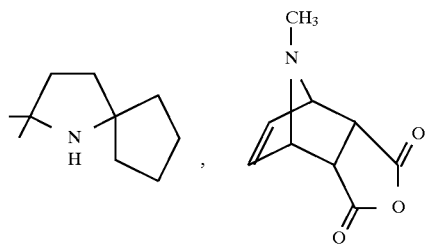

(A) Solid catalyst component

The solid catalyst component prepared in the present invention comprises Mg, Ti, a halogen and a cyclic organic nitrogen compound (C), and the example of its composition formula preferably includes $Mg_mTiX_p[Py]_q$ (wherein X is a halogen atom, Py is a cyclic organic nitrogen compound, m, p, q are numbers satisfying inequalities $1<m<51$, $5<p\leq106$, $0.1<q<10$ and $m\leq p$).

In the present invention, preparation of the solid catalyst component is carried out by reacting a solid catalyst component precursor (D) containing Mg, Ti and OR group (wherein R represents a hydrocarbon group having 1 to 20 carbon atoms) with a mixture of a cyclic organic nitrogen compound (C) and a titanium compound (E) having at least one Ti-halogen bond, a mixture of a cyclic organic nitrogen compound (C), a titanium compound (E) having at least one Ti-halogen bond and an electron donative compound, or the like, or with a cyclic organic nitrogen compound (C) and a titanium compound (E) having at least one Ti-halogen bond successively, or a cyclic organic nitrogen compound (C) and a mixture of a titanium compound (E) having at least one Ti-halogen bond and an electron donative compound successively.

The solid catalyst component precursor (D) is a solid containing Mg, Ti and OR group (wherein R indicates a hydrocarbon group having 1 to 20 carbon atoms), and can be obtained by the method for preparing a catalyst component disclosed in JP-B-43013050(1968), JP-B-46034098(1971), JP-B-46034092(1971), JP-A-49086483(1974) or the like, or the method for preparing a solid product by reduction of an alkoxy titanium compound with an organomagnesium compound disclosed in JP-B-03043283(1991). Further, for obtaining a solid containing Mg, Ti and OR group fixed on the porous organic polymer as the precursor (D), the above-described method is conducted in the presence of the porous organic polymer. Among these solid catalyst component precursors (D), the most preferable precursor is the solid product obtained by reduction of an alkoxy titanium compound with an organomagnesium compound ( in the presence of the porous organic polymer) disclosed in JP-B-03043283(1991).

Preparation examples of the solid catalyst component precursor (D) using this solid product and the solid catalyst component (A) are explained below. (a) Alkoxy titanium compound The alkoxy titanium compound is represented by the general formula $Ti(OR^1)_a X_{4-a}$ ($R^1$ is a hydrocarbon group having 1 to 20 carbon atoms, X is a halogen atom, a is a number satisfying an inequality $0<a<4$).

The specific example of $R^1$ includes an alkyl group having 1 to 20 carbon atoms such as methyl, ethyl, n-propyl, iso-propyl, n-butyl, iso-butyl, n-amyl, iso-amyl, n-hexyl, n-heptyl, n-octyl, n-decyl, n-dodecyl and the like, an aryl group having up to 20 carbon atoms such as phenyl, cresyl, xylyl, naphtyl and the like, a cycloalkyl group having up to 20 carbon atoms such as cyclohexyl, cyclopentyl and the like, an allyl group such as propenyl and the like, an aralkyl group having up to 20 carbon atoms such as benzyl and the like.

Among these compounds, an alkyl group having 2 to 18 carbon atoms and an aryl group having 6 to 18 carbon atoms are preferable. A titanium compound having different $OR^1$ groups of 2 or more may also be used.

The halogen atom represented by X includes chlorine, bromine and iodine. Especially chlorine gives a preferable result.

The numerical value of "a" in the titanium compound represented by the general formula $Ti(OR^1)_a X_{4-a}$ is defined by an inequality $0<a<4$, preferably by an inequality $2<a<4$, particularly preferably by an equation $a=4$.

The titanium compound represented by the general formula $Ti(OR^1)_a X_{4-a}$ can be prepared by a known method. For example, a method in which $Ti(OR^1)_4$ and $TiX_4$ are reacted in a predetermined ratio or a method in which $TiX_4$ is reacted with corresponding alcohols in a predetermined amount, may be adopted.

(b) Organic silicon compound having Si—O bond

In reducing an alkoxy titanium compound with an organomagnesium compound, it is preferable that an organic silicon compound having an Si—O bond coexists. This organic silicon compound having an Si—O bond includes compounds represented by the following formulae:

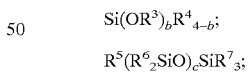

and

(wherein $R^3$ is a hydrocarbon group having 1 to 20 carbon atoms, each of $R^4$, $R^5$, $R^6$, $R^7$ and $R^8$ is a hydrocarbon group having 1 to 20 carbon atoms or a hydrogen atom, b is a number satisfying an inequality $0<b<4$, c is an integer from 1 to 1000, d is an integer from 2 to 1000)

The specific examples of the organic silicon compound include tetramethoxysilane, dimethyldimethoxysilane, tetraethoxysilane, triethoxyethylsilane, diethoxydiethylsilane, ethoxytriethylsilane, tetra-iso-propoxysilane, di-iso-propoxy-di-iso-propylsilane, tetrapropoxysilane, dipropoxydipropylsilane, tetra-n- butoxysilane, di-n-butoxy-di-n-butylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexa-n-propyldisiloxane, octaethyltrisiloxane, polydimethylsiloxane, polydiphenylsiloxane, polymethylhydrosiloxane, polyphenylhydrosiloxane and the like.

Among these organic silicon compounds, an alkoxy silane compound represented by the general formula $Si(OR^3)_b R^4_{4-b}$ is preferable and b is preferably 1<b<4, and especially, an tetraalkoxysilane compound in which b=4 is preferable.

(c) Organomagnesium compound

As the organomagnesium compound, any type of organomagnesium compound having a magnesium-carbon bond can be used. Especially, a Grignard compound represented by the general formula $R^9MgX$ (wherein $R^9$ indicates a hydrocarbon group having 1 to 20 carbon atoms, and X indicates an halogen atom) and a dialkylmagnesium compound or a diarylmagnesium compound represented by the general formula $R^{10}R^{11}Mg$ (wherein each of $R^{10}$ and $R^{11}$ indicates a hydrocarbon group having 1 to 20 carbon atoms) are suitably used. Here, $R^{10}$ and $R^{11}$ may be the same or different. The specific example of $R^9$ to $R^{11}$ includes an alkyl, aryl, aralkyl and alkenyl group having up to 20 carbon atoms such as methyl, ethyl, n-propyl, iso-propyl, n-butyl, sec-butyl, tert-butyl, iso-amyl, n-hexyl, n-octyl, 2-ethylhexyl, phenyl, benzyl and the like. Especially, the Grignard compound represented by $R^9MgX$ is preferably used in an ether solution in the point of catalyst efficiency.

There may also be used a hydrocarbon soluble complex composed of the above-described organomagnesium compound and an organometallic compound which solubilizes the organomagnesium compound into hydrocarbon. The example of the organometallic compound includes organic compounds of Li, Be, B, Al or Zn.

Further, in the other preferable embodiment of the present invention, the above-mentioned solid catalyst component is that which is obtained by fixing Mg, Ti, halogen and the cyclic organic nitrogen compound (C) on an porous organic polymer. In this case, the following porous organic polymers are used.

(d) Organic porous polymer

The organic porous polymer used for a carrier in the present invention preferably has porous particle form such as porous polymer beads, and includes styrene polymers, acrylate polymers, methacrylate polymers, acrylonitrile polymers, vinylchloride polymers, olefin polymers and the like. More specifically, there are illustrated polystyrene, styrene-divinylbenzene copolymer, styrene-N,N-alkylene dimethacrylamide copolymer, styrene-ethylene glycol dimethacrylate copolymer, polymethylacrylate, polyethylacrylate, methylacrylate-divinylbenzene copolymer, ethylacrylate-divinylbenzene copolymer, polymethylmethacrylate, methylmethacrylate-divinylbenzene copolymer, polyethylene glycol dimethacrylate, polyacrylonitrile, acrylonitrile-divinylbenzene copolymer, polyvinylchloride, polyvinylpyrrolidine, polyvinylpyridine, ethylvinylbenzene-divinylbenzene copolymer, polyethylene, ethylene-methylacrylate copolymer, polypropylene and the like. Among these organic porous polymer, styrene polymers, vinyl chloride polymers, olefin polymers or acrylonitrile polymers are preferably used, and polystyrene, styrene-divinylbenzene copolymer and polyvinyl chloride are more preferably used.

The weight average particle size (hereinafter, referred to simply as "average particle size") of the organic porous polymer used for carrier is from 5 to 1000 μm, preferably from 10 to 500 μm, particularly preferably from 15 to 200 μm. The micro pore volume of the organic porous polymer for the micro pore radius of 100 to 5000 A is preferably not less than 0.1 cc/g, more preferably not less than 0.2 cc/g, particularly preferably not less than 0.3 cc/g. When the micro pore volume of the organic porous polymer is too small, a catalyst component can not be effectively supported. Even if the micro pore volume of the organic porous polymer is not less than 0.1 cc/g, a catalyst component can not be effectively supported unless the pore volume is the one in the micro pore radius of 100 to 5000 A. (e) Synthesis of solid catalyst component precursor (D)

Reduction of a titanium compound (a) with an organomagnesium compound (c) can be carried out, for example, by adding the organomagnesium compound (c) to the titanium compound (a) or a mixture of the titanium compound (a) and the organic silicon compound (b), or inversely adding the titanium compound (a) or the mixture to the organomagnesium compound (c). It is preferable to use the organic silicon compound (b) in the reduction.

When the organic porous polymer (d) is used, it is preferable to carry out the above-described operation in the presence of the organic porous polymer (d). Deposition of solid due to the reduction occurs on the organic porous polymer particle and thus obtained solid product maintains the form of the organic porous polymer. And, it is preferable that the solid product contains no fine powder.

It is preferable that the titanium compound (a) and the organic silicon compound (b) are dissolved or diluted in an appropriate solvent to be used. Besides, when the organic porous polymer (d) is used, this operation is carried out in the presence of the polymer (d) or the polymer (d) is added to the resulting mixed liquor.

As this solvent, there is used an aliphatic hydrocarbon such as hexane, heptane, octane, decane or the like, an aromatic hydrocarbon such as toluene, xylene or the like, an alicyclic hydrocarbon such as cyclohexane, methylcyclohexane, decalin or the like, or an ether compound such as diethyl ether, di-n-butyl ether, diisoamyl ether, tetrahydrofuran or the like.

The reduction temperature is preferably from −50 to 70° C., more preferably from −30° to 50° C., particularly preferably from −25° to 35° C.

Dropping time is not particularly restricted, and usually from about 30 minutes to about 6 hours. After completion of the reduction, post reaction may be further conducted at a temperature of 20° to 120° C.

When the organic silicon compound (b) is used, the amount of the organic silicon compound (b) used is preferably 1 to 500, more preferably 1 to 300, particularly preferably 3 to 100 in terms of the atomic ratio of silicon atoms in the silicon compound to titanium atoms in titanium compound (a) (Si/Ti).

The amount of the organomagnesium compound (c) used is preferably 0.1 to 10, more preferably 0.2 to 5.0, particularly preferably 0.5 to 2.0 in terms of the atomic ratio of titaniums atom plus silicon atoms to magnesium atoms ((Ti+Si)/Mg). Namely, the amounts of the titanium compound (a), the organic silicon compound (b) and organomagnesium compound (c) used may be determined so that the value of m is preferably 1 to 51, more preferably 2 to 31, particularly preferably 4 to 26, the m indicating molar ratio Mg/Ti in the composition formula $Mg_m Ti x_p [Py]_q$ of the solid catalyst component (A).

When the organic porous polymer (d) is used as a carrier, the amount of the carrier used is in the range of preferably from 20 to 90% by weight, more preferably from 30 to 80% by weight based on the solid product.

A mixture containing the solid product obtained in the reduction is subjected to solid-liquid separation and washed several times with an inert hydrocarbon solvent such as hexane, heptane or the like to obtain a solid catalyst component precursor (D).

Thus obtained solid catalyst component precursor (D) contains trivalent titanium, magnesium and a hydrocarbyloxy group, and usually shows non-crystallinity or extremely weak crystallinity. The precursor having non-crystalline structure is particularly preferable from the view point of catalytic efficiency.

(f) Synthesis of solid catalyst component (A)

The solid catalyst component precursor (D) containing Mg, Ti and OR group obtained in the above-described (e) is reacted with, for example, a mixture of the cyclic organic nitrogen compound (C) and the titanium compound (E) having at least one Ti-halogen bond or a mixture of the cyclic organic nitrogen compound (C), the titanium compound (E) having at least one Ti-halogen bond and an electron donative compound, or with the cyclic organic nitrogen compound (C) and the titanium compound (E) having at least one Ti-halogen bond successively or the cyclic organic nitrogen compound (C), the titanium compound (E) having at least one Ti-halogen bond and an electron donative compound, successively, to produce the solid catalyst component (A). As the order of the reactions, the cyclic organic nitrogen compound (C) may be reacted first or the titanium compound (E) may be reacted first, it is more preferable to react the cyclic organic nitrogen compound (C) prior to the titanium compound (E). Also, the titanium compound (E) and the cyclic organic nitrogen compound (C) may be reacted previously, then reacted with the solid catalyst component precursor (D). Moreover, reactions above may be repeated twice or more.

In the following description, explanation is made with respect to the method in which the cyclic organic nitrogen compound is reacted first.

The amount of the cyclic organic nitrogen compound (C) used is usually 0.1 to 1000 mmol, preferably 0.3 to 500 mmol, particularly preferably 0.5 to 300 mmol per 1 g of the solid catalyst component precursor (D). In other word, the amount of the cyclic organic nitrogen compound used may be determined so that the value of q is in the range of from 0.1 to 10, the q indicating molar ratio of the cyclic organic nitrogen compound/Ti in the composition formula $Mg_mTix_p[Py]_q$ of the solid catalyst component (A). From the view point of reduction in the amount produced of lower molecular weight components, the range of q is preferably $0.3<q<5.0$, more preferably $0.5<q<4.0$.

The treatment of the solid catalyst component precursor (D) with the cyclic organic nitrogen compound (C) may be carried out by any known means which can contact the both compounds such as a mechanical milling means such as a ball mill or the like, slurry method or the like. However, the mechanical milling means is not preferable from the industrial point of view since when mechanical milling is conducted, the obtained solid catalyst component (A) contains a large amount of fine powder and has a wide particle size distribution. It is preferable to contact the both compounds in the presence of a diluent (slurry method).

As the diluent, an aliphatic hydrocarbon such as pentane, hexane, heptane, octane or the like, an aromatic hydrocarbon such as benzene, toluene, xylene or the like, an alicyclic hydrocarbon such as cyclohexane, cyclopentane or the like, or a halogenated hydrocarbon such as 1,2-dichloroethane, monochlorobenzene or the like can be used.

The amount of the diluent used is not particularly restricted, and it is preferably 0.1 ml to 1000 ml, more preferably 1 ml to 100 ml per 1 g of the solid catalyst component precursor (D). Treating temperature is preferably −50° to 150° C., more preferably 0° to 120° C. Treating time is also not particularly restricted, and preferably 1 minute to 3 hours. After completion of the treatment, there is obtained a solid treated with the cyclic organic nitrogen compound. At this stage, the cyclic organic nitrogen compound treated solid may be used for the following reaction after isolated, or as it is in the slurry state without isolation.

Next, the cyclic organic nitrogen compound treated solid obtained in the above-described method is reacted with the titanium compound (E) having at least one Ti-halogen bond. In this reaction, the reaction may be carried out in the coexistence of an electron donative compound.

As the titanium compound (E) having at least one Ti-halogen bond, a titanium compound having at least one Ti—Cl bond is preferable. Specifically, titanium halides, titanium alkoxide halides, titanium amide halides and the like are listed, and titanium tetrachloride is especially preferable in the point of catalytic efficiency of the catalyst obtained.

The electron donative compound means a compound containing an atom having a unshared electron pair such as oxygen and nitrogen other than the cyclic organic nitrogen compound (C), and the example includes an ethers, ketones, esters, carboxylic acids, amines, amides and the like. Among these, ethers are preferred. As the specific example, there are preferably illustrated dialkyl ether such as diethyl ether, di-n-propyl ether, diisopropyl ether, di-n-butyl ether, dineopentyl ether, di-n-hexyl ether, di-n-octyl ether, methyl n-butyl ether, methyl isoamyl ether, ethyl isobutyl ether and the like. Among them, di-n-butyl ether, and isoamyl ether are particularly preferable.

The reaction with the titanium compound (E) is preferably carried out in a slurry state. As a solvent used for making slurry, an aliphatic hydrocarbon such as pentane, hexane, heptane, octane, decane or the like, an aromatic hydrocarbon such as toluene, xylene or the like, an alicyclic hydrocarbon such as decalin, cyclohexane, methylcyclohexane or the like, or a halogenated hydrocarbon such as dichloroethane, trichloroethane, trichloroethylene, monochlorobenzene, dichlorobenzene, trichlorobenzene or the like is listed.

The slurry concentration is preferably from 0.05 to 0.5 g solid/ml solvent, more preferably from 0.1 to 0.4 g solid/ml solvent.

The reaction temperature is preferably from 30° to 150° C., more preferably from 45° to 120° C., especially preferably from 60° to 100° C. The reaction time is not particularly restricted, and usually from 30 minutes to 20 hours.

The reaction of the titanium compound (E) with the cyclic organic nitrogen compound treated solid may be repeated twice or more.

For addition of the cyclic organic nitrogen compound treated solid and the titanium compound (E), any of the following methods can be adopted: a method in which the titanium compound (E) is added to the cyclic organic nitrogen compound treated solid; and the cyclic organic nitrogen compound treated solid is added to a solution of the titanium compound (E).

Addition of the electron donative compound and the titanium compound (E) to the cyclic organic nitrogen compound treated solid may be preferably carried out by adding the electron donative compound and the titanium compound (E) previously mixed to the the cyclic organic nitrogen compound treated solid or by adding simultaneously the electron donative compound and the titanium compound (E) to the cyclic organic nitrogen compound treated solid.

The amount of the titanium compound (E) used is preferably from 0.1 to 1000 mmol, more preferably from 0.3 to 500 mmol, particularly preferably from 0.5 to 300 mmol per 1 g of the cyclic organic nitrogen compound treated solid. Namely, the amount of the titanium compound (E) used may be preferably determined so that the value of q indicating a molar ratio of the cyclic organic nitrogen compound/Ti is from 0.1 to 10, the value of p indicating a molar ratio of halogen/Ti is $5 \leq p < 106$, and m and p have values which satisfy the inequality m<p, in the composition formula $Mg_m Ti x_p [Py]_q$ of the solid catalyst component (A). From the viewpoint of catalytic efficiency, 1.5 m<p is more preferable and 2m<p is particularly preferable.

The solid catalyst component (A) obtained in the above-described method is separated to solid and liquid and washed several times with an inert hydrocarbon solvent such as hexane, heptane or the like, before used for polymerization.

After separation to solid and liquid, washing may preferably be conducted once or more at a temperature of 50° to 120° C. with a large amount of a halogenated hydrocarbon solvent (e.g. monochlorobenzene), an aromatic hydrocarbon (e.g. toluene, xylene) or the like, further washing may be repeated several times with an aliphatic hydrocarbon solvent (e.g. hexane), before used forpolymerization.

Thus obtained solid is used as the solid catalyst component (A). (B) Organoaluminum compound The organic aluminum compound (B) used in combination with the above-mentioned solid catalyst component (A) in the present invention is a compound having at least one Al-carbon bond in its molecule.

Representative examples are shown below by the general formulae:

$R^{12}_\gamma AlY_{3-\gamma}$;

and

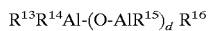

$R^{13}R^{14}Al\text{-}(O\text{-}AlR^{15})_d R^{16}$

Herein, each of $R^{12}$, $R^{13}$, $R^{14}$, $R^{15}$ and $R^{16}$ is a hydrocarbon group having 1 to 8 carbon atoms, Y is a halogen atom, a hydrogen atom or an alkoxy group having 1 to 8 carbon atoms. γ is a number satisfying 2<γ<3. d is a number satisfying 1<d<30.

The specific examples of the organoaluminum compound include a trialkylaluminum such as triethylaluminum, tri-n-butylaluminum, triisobutylaluminum, tri-n-hexylaluminum and the like, a dialkylaluminum hydride such as diethylaluminum hydride, di-n-butylaluminum hydride, diisobutylaluminum hydride, di-n-hexylaluminum hydride and the like, a dialkylaluminum halide such as diethylaluminum chloride, di-n-butylaluminum chloride, diisobutylaluminum chloride, di-n-hexlyaluminum chloride and the like, a mixture of a trialkylaluminum and a dialkylaluminumhalide, an alkylalumoxane such as tetraethyldialumoxane, tetra-n-butyldialumoxane, polymethylalumoxane, polyethylalumoxane and the like.

Among these organoaluminum compounds, a trialkylaluminum, a mixture of a trialkylaluminum and a dialkylaluminum halide, an alkylalumoxane are preferable, and especially, triethylaluminum, tri-n-butylaluminum, triisobutylaluminum, tri-n-hexylaluminum, a mixture of triethylaluminum and diethylaluminum chloride, and tetraethyldialumoxane are preferable.

The amount of the organoaluminum compound (B) used can be selected in the wide range such as 1 to 1000 mole per 1 mole of titanium atom in the solid catalyst component (A), and the range of 5 to 600 mole is particularly preferable.

[Preliminary polymerization]

The solid catalyst component (A) of the present invention is preferably preliminarily polymerized before use for main polymerization (referred to simply as "polymerization" hereinafter). The preliminary polymerization is carried out by contacting the solid catalyst component with the above-described organoaluminum compound (B) and an olefin.

As the olefin, ethylene, propylene, butene-1 and the like are listed. The preliminary polymerization may be carried out in either homopolymerization or copolymerization.

To obtain a prepolymer of high crystallinity, a known electron donor and hydrogen may coexist. As the electron donor, an organic compound having an Si—OR bond (wherein R indicates a hydrocarbon group having 1 to 20 carbon atoms) may preferably be used.

In preliminary polymerization of the solid catalyst component (A) of the present invention, the component (A) is preferably made to a slurry, and the solvent for making the slurry includes an aliphatic hydrocarbon such as butane, hexane, heptane and the like, an aromatic hydrocarbon such as toluene, xylene and the like, and the like.

The concentration of the slurry is preferably from 0.001 to 0.5 g solid/ml solution, more preferably from 0.01 to 0.3 g solid/ml solution. Further, it is preferable to use the organoaluminum compound so that Al/Ti molar ratio is usually from 0.1 to 100, particularly from 1 to 10.

The preliminary polymerization is preferably carried out at a temperature of –30° to 80° C., more preferably –10° to 50° C.

It is preferable that the amount of the preliminary polymerization is usually 0.1 to 100 g, particularly from 0.5 to 50 g per 1 g of the solid catalyst component (A).

[Production of olefin polymer]

In the present invention, one or more kinds of olefins can be polymerized using the above-mentioned solid catalyst component (A) or the preliminarily polymerized solid catalyst component, and the organoaluminum compound (B).

One of specific embodiment in the main polymerization is explained below.

Feeding of the solid catalyst component and the organoaluminum compound to a polymerization vessel is not particularly restricted except feeding those with an inert gas such as nitrogen, argon or the like, hydrogen, an olefin or the like in a water-free state.

The solid catalyst component and the organoaluminum compound may be fed separately, or may be previously contacted before fed.

The polymerization can be conducted by known methods such as gas phase polymerization, slurry polymerization and the like.

The polymerization is preferably carried out at a temperature lower than the temperature at which the produced polymer melts, more preferably in the range of from 20° to 100° C., particularly preferably of from 40° to 90° C. under pressure in the range of ordinary pressure to 40 kg/cm². Further, in the polymerization, hydrogen may be added as a molecular weight regulator. The polymerization can be carried out continuously or batch wise.

The olefin which can be applied for the present invention has two or more carbon atoms, and the specific example thereof includes ethylene and α-olefines having 3 or more carbon atoms, preferably ethylene and α-olefines. having 3 to 20 carbon atoms such as propylene, butene-1, pentene-1, hexene-1, 3-methyl-pentene-1, 4-methylpentene-1 and the like. In the present invention, homopolymerization of the olefin or copolymerization of 2 or more kinds of olefins is possible. Particularly, copolymerization of ethylene with one or more kinds of said α-olefins is preferable. In this case, an ethylene copolymer can be produced by contacting the catalyst with a mixture of ethylene and one or more kinds of said α-olefins.

EXAMPLE

The present invention is explained in detail using the following examples, but is not limited thereto.

Properties of polymers in the examples were measured according to the following methods.

(1) Density was measured according to JIS K-6760.

(2) Flow rate (FR) was measured at 190° C. according to ASTM D1238, (3) Flow rate ratio (FRR) was adopted as a measure for melt flowability. FRR is expressed as the ratio of the flow rate (FR) under a load of 21.60 kg to that under a load of 2.160 kg in the measuring method of flow rate (FR) according to ASTM D1238.

$$FRR = \frac{\text{Flow rate under a load of 21.60 kg}}{\text{Flow rate under a load of 2.160 kg}}$$

In general, wider the molecular weight distribution of a polymer, higher the value of FRR.

(4) Lower molecular weight components were evaluated by content of xylene-soluble portion at 25° C. (hereinafter, abbreviated as "CXS").

(5) Composition analyses were conducted by ICP emission analysis method using Optima 3000 (manufactured by Perkin Elmer Ltd.) with respect to Ti and Cl, gas chromatograph GC-7A (manufactured by Shimadzu Corporation, column packing; PEG 6000 10% and SHIMALITE TPA 60/80) with respect to alcohol, and gas chromatograph GC-7A (column packing; AMIPACK 141) with respect to a piperidine compound.

Example 1

(1) Synthesis of solid catalyst component precursor (D)

An inner atmosphere of a 500 ml flask equipped with a stirrer and a dropping funnel was replaced with nitrogen, then, to this was added 160 ml of hexane, 44 ml (196.4 mmol) of tetraethoxysilane and 4.4 ml (12.9 mmol) of tetra-n-butoxytitanium and the resulting mixture was stirred at 30° C. for 30 minutes.

Then, 100 ml of an di-n-butyl ether solution of n-butylmagnesium chloride (manufactured by Yuki Gosei Yakuhin Industry Ltd. concentration; 2.1 mole/liter) was added dropwise over one hour from the dropping funnel while maintaining the temperature of the flask at 5° C. After completion of the dropping, stirring was conducted for one hour at 5° C. and additional one hour at 20° C., the mixture was then filtered, washing with 200 ml of hexane was repeated three times, and drying under reduced pressure was carried out to obtain 31.2 g of a brown solid product (solid catalyst component precursor (D)). The composition of the resulting solid product was $Mg_{14.9}TiCl_{14.9}[OR]_{17.0}$.

(2) Synthesis of the solid catalyst component (A)

An inner atmosphere of a flask having inner volume of 100 ml equipped with a stirrer and a dropping funnel was replaced with nitrogen, then, to this was added 20 ml of toluene, 3.95 g of the solid catalyst component precursor (D) prepared in the above-described (1) and 2.4 ml of 2,6-dimethylpiperidine (hereinafter, abbreviated as "2,6-DMP") and the resulting mixture was heated to 70° C. in 30 minutes. After treatment at 70° C. for 30 minutes, 2.0 ml of $TiCl_4$ was added and reaction at 95° C. was carried out for 3 hours. After the reaction, the mixture was separated to solid and liquid at 95° C., and washing with 30 ml of toluene was repeated six times. Further, washing with 30 ml of hexane was repeated three times, then, drying under reduced pressure was conducted to obtain 3.90 g of a brown catalyst component. The composition of the resulting solid catalyst component was $Mg_{12.1}TiCl_{27.0}[Py]_{1.2}$.

(3) Polymerization

An inner atmosphere of an autoclave having inner volume of 3 liter equipped with a stirrer was thoroughly replaced with argon, then, to this were added 620 g of butane, 130 g of butene-1 and hydrogen corresponding to 650 mmHg and the resulting mixture was heated to 70° C. Then, 6.0 kg/cm² of ethylene was added. The solid catalyst component (A) (25.4 mg) obtained in the above-mentioned (2) and 5.7 mmol of triethylaluminum were charged with pressure of argon to initiate polymerization. Then, polymerization was carried out for 3 hours at 70° C. with feeding ethylene continuously to keep the total pressure constant.

After completion of the polymerization, unreacted monomers were purged and 130 g of an polymer having an excellent powder property was obtained. Further, no polymer adhered to the inner wall of the autoclave and the stirrer at all.

The amount of the polymer produced per 1 g of titanium atom (catalyst activity) was 197,000 g polymer/g titanium which means very high catalyst activity. Further, in this polymer, the density was 0.9183 g/cm³, FR was 0.72 g/10 minutes, FRR was 27.6 and CXS was 10.6% by weight, and the content of lower molecular weight components was small.

Comparative Example 1

Polymerization was carried out in the same manner as in Example 1 except that 100 mg of the solid catalyst component precursor (D) synthesized in Example 1 (1) was used instead of the solid catalyst component (A) in Example 1 (3). The result is shown in Table 1. The amount of a polymer produced was small.

Comparative Example 2

A solid catalyst components was prepared in the same manner as in Example 1 (2) except that 2,6-DMP was not used and polymerization was carried out in the same manner as in Example 1 (3) except using this solid catalyst component. The result is shown in Table 1. Though catalyst activity was high like in Example 1, the obtained polymer contained a very large amount of lower molecular weight components.

Example 2

A solid catalyst component was prepared and polymerization was carried out in the same manner as in Example 1 except that the amount of the solid catalyst component precursor (D) was changed to 6.09 g and the amount of the 2,6-DMP was changed to 2.7 ml in Example 1 (2). The result is shown in Table 1. The catalyst activity was very high, and the obtained polymer contained a small amount of lower molecular weight component.

Example 3

(1) Synthesis of the solid catalyst component (A)

An inner atmosphere of a flask having inner volume of 100 ml was replaced with nitrogen, then, to this were added 21 ml of toluene, 3.8 ml of $TiCl_4$ and 3.5 ml of 2,6-DMP and the resulting mixture was reacted for one hour at room temperature to prepare a reaction solution. An inner atmosphere of a flask having inner volume of 100 ml equipped with a stirrer and a dropping funnel was replaced with nitrogen, then, to this were added 14 ml of toluene and 7.55 g of the solid catalyst component precursor (D) synthesized in Example 1 (1) and the resulting mixture was heated to 70° C. After reaching to 70° C., the previously prepared reaction solution was added and the resulted mixture was heated to 95° C. and reacted for 8 hours. After the reaction, the mixture was separated to solid and liquid at 95° C. and washing with 38 ml of toluene was repeated three times. Then, 40 ml of toluene was added, heated to 70° C., $TiCl^4$ (1.89 ml) was added, heated to 95° C., and reaction was carried out for one hour. After the reaction, the mixture was separated to solid and liquid at 95° C., and washing with toluene (38 ml) was repeated five times. Further, washing with 28 ml of hexane was repeated twice at room temperature, drying under reduced pressure was conducted to obtain 8.05 g of a solid catalyst component. The composition of the resulting solid catalyst component was $Mg_{6.8}TiCl_{18.4}[Py]_{1.4}$.

(2) Polymerization

An inner atmosphere of an autoclave having inner volume of 3 liter equipped with a stirrer was thoroughly replaced with argon, then, to this were added 610 g of n-butane, 140 g of butene-1 and an amount corresponding to 840 mmHg of hydrogen and the resulting mixture was heated to 70° C. Then, 6.0 kg/cm$^2$ of ethylene was added. The solid catalyst component (A)(4.8 mg) obtained in the above-mentioned (1) and 5.7 mmol of tri-n-butylaluminum were charged with argon pressure to initiate polymerization. Then, polymerization was carried out for 3 hours at 70° C. with feeding ethylene continuously while maintaining the total pressure constant.

After completion of the polymerization, unreacted monomers were purged and 82 g of an polymer having an excellent powder property was obtained. Further, no polymer adhered to the inner wall of the autoclave and the stirrer at all.

The catalyst activity was very high as 389,000 g polymer/g titanium. Further, in this polymer, the density was 0.9198 g/cm$^3$, FR was 0.68 g/10 minutes, FRR was 30.7 and CXS was 4.9% by weight, and the content of lower molecular weight components was small.

Example 4

(1) Synthesis of solid catalyst component precursor (D)

An inner atmosphere of a flask having inner volume of 1000 ml equipped with a stirrer and a dropping funnel was replaced with nitrogen, then, to this were added 51.0 g of a styrene-divinylbenzene copolymer (the average particle size was 37 μm, and as the result of measurement by a porosimeter, the micro pore volume (cc/g) for the micro pore radius in the range between 100 and 5000 A (hereinafter, abbreviated as dvp) was 1.05 cc/g) which was dried for 5 hours at 80° C., 250 ml of heptane, 47.5 ml (228 mmol) of tetraethoxysilane and 4.5 g (13.2 mmol) of tetra-n-butoxytitanium and the resulting mixture was stirred at 30° C. for 30 minutes.

Then, 114 ml of an di-n-butyl ether solution of n-butylmagnesium chloride (manufactured by Yuki Gosei Yakuhin Industry Ltd. concentration; 2.1 mole/liter) was added dropwise over one hour from a dropping funnel while maintaining the temperature of the flask at 5° C. After completion of the dropping, stirring was conducted for one hour at 5° C. and additional one hour at 20 ° C., the mixture was then filtered, washing with 300 ml of hexane was repeated three times, and drying under reduced pressure was conducted to obtain 85.2 g of a brown solid product (solid catalyst component precursor (D)). The composition of the resulting solid product was $Mg_{17.9}TiCl_{17.9}[OR]_{20.9}$.

(2) Synthesis of solid catalyst component (A)

An inner atmosphere of a flask having inner volume of 100 ml equipped with a stirrer and a dropping funnel was replaced with nitrogen, then, to this were added 29 ml of toluene and 5.7 g of the solid catalyst component precursor (D) produced in the above-described (1) and the resulting mixture was heated to 95° C. in 30 minutes. Then, 2.6 ml of 2,6-DMP was added, and treatment at 95° C. was carried out for 30 minutes, then 42.9 ml of $TiCl_4$ was added and reaction at 95 ° C. was carried out for 3 hours. After completion of the reaction, the mixture was separated to solid and liquid at 95° C., and washing with 30 ml of toluene was repeated six times. Further, washing with 30 ml of hexane was repeated three times, then, drying under reduced pressure was conducted to obtain 5.43 g of a brown solid catalyst component (A). The composition of the resulted solid catalyst component was $Mg_{4.46}TiCl_{11.68}[Py]_{1.48}$.

(3) Polymerization

An inner atmosphere of an autoclave having inner volume of 3 liter equipped with a stirrer was fully replaced with argon, then, to this were added 650 g of butane, 150 g of butene-1 and 650 mmHg of hydrogen and the resulting mixture was heated to 70° C. Then, 6.0 kg/cm$^2$ of ethylene was added. The solid catalyst component (A)(29.4 mg) obtained in the above-mentioned (2) and 5.7 mmol of triethylaluminum were charged with argon pressure to initiate polymerization. Then, polymerization was carried out for 3 hours at 70° C. with feeding ethylene continuously while maintaining the total pressure constant.

After completion of the polymerization, unreacted monomers were purged and 76 g of an polymer having an excellent powder property and a high bulk density of 0.35 g/cm$^3$ was obtained. Further, no polymer adhered to the inner wall of the autoclave and the stirrer at all.

The catalyst activity was very high as 132,000 g polymer/g titanium. Further, in this polymer, the density was 0.9179 g/cm$^3$, FR was 1.19, FRR was 26.4 and CXS was 9.4%, and the content of lower molecular weight component was small.

Comparative Example 3

Polymerization was carried out in the same manner as in Example 4 except that 100 mg of the solid catalyst component precursor (D) synthesized in Example 4 (1) was used instead of the solid catalyst component (A) in Example 4 (3). The result is shown in Table 1. A small amount of a polymer was produced.

Comparative Example 4

A solid catalyst components was prepared in the same manner as in Example 4 (2) except that 2,6-DMP was not used and polymerization was carried out using the solid catalyst component above in the same manner as in Example 4. The result is shown in Table 1. Though the catalyst activity was high as well as in Example 4, the resulting polymer had a high CXS and contained a large amount of lower molecular weight component. And the bulk density of polymer was low as 0.21 g/cm$^3$.

Example 5
(1) Synthesis of solid catalyst component (A)

An inner atmosphere of a flask having inner volume of 100 ml equipped with a stirrer and a dropping funnel was replaced with nitrogen, then, to this was added 34 ml of toluene, 6.7 g of the solid catalyst component precursor (D) synthesized in Example 1 (1) and 3.1 ml of 2,6-DMP and the resulting mixture was heated to 70° C. over 30 minutes. After treatment at 70° C. for 30 minutes, 3.4 ml of TiCl$_4$ was added, and reaction was conducted at 95° C. for 3 hours. After completion of the reaction, the mixture was separated to solid and liquid at 95° C., and washing with toluene (40 ml) was repeated six times. Further, washing with 40 ml of hexane was repeated three times, then drying under reduced pressure was conducted to obtain 8.21 g of a brown solid catalyst component (A). The composition of the resulting solid catalyst component (A) was $Mg_{2.6}TiCl_{6.7}[Py]_{1.2}$.

(2) Polymerization

Polymerization was conducted in the same manner as in Example 4 using the solid catalyst component (A) synthesized in the above-described (1). The result is shown in Table 1. The catalyst activity was very high and the resulting polymer contained a small amount of lower molecular component. The polymer had a high bulk density of 0.35 g/cm$^3$.

Example 6

Polymerization was carried out in the same manner as in Example 5 except that triisobutylaluminum was used instead of triethylaluminum in Example 5 (2). The result is shown in Table 1. The catalyst activity was very high and the resulting polymer contained a small amount of lower molecular component. The polymer had a high bulk density of 0.40 g/cm$^3$.

As described above, it is possible to produce an olefin polymer containing a small amount of lower molecular weight component with an extremely high catalyst activity in gas phase polymerization and slurry polymerization, by using the catalyst of the present invention. Further, it is possible to control particle form of the solid catalyst component very well and produce an olefin polymer having a good powder property, namely good flowability containing a little fine particles.

a mixture of a cyclic organic nitrogen compound (C) and a titanium compound (E) having at least one Ti-halogen bond;

a mixture of a cyclic organic nitrogen compound (C), a titanium compound (E) having at least one Ti-halogen bond and an electron donative compound;

a cyclic organic nitrogen compound (C) and a titanium compound (E) having at least one Ti-halogen bond successively; or a cyclic organic nitrogen compound (C) and a mixture of a titanium compound (E) having at least one Ti-halogen bond and an electron donative compound successively, wherein the cyclic organic nitrogen compound (C) is selected from the group consisting of piperidine, N-methylpiperidine, 2,6-dimethylpiperidine, 3,5-dimethylpiperidine, N-methyl-2,6-dimethylpiperidine, N-methyl-3,5-dimethylpiperidine, 2,2,6-trimethylpiperidine, 2,2,6,6-tetramethylpiperidine. N-methyl-2,2,6,6-tetramethylpiperidine, 2,2,4,6,6-pentamethylpiperidine, 4-acetyloxy-2,2,6,6-tetramethylpiperidine and compounds represented by the following formulae

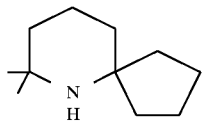

and

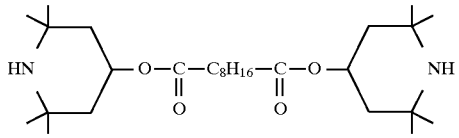

2. A method for preparing a solid catalyst component for olefin polymerization according to claim 1, wherein the solid catalyst component precursor (D) is a solid product obtained by reduction of an alkoxy titanium compound with an organomagnesium compound.

3. A method for preparing a solid catalyst component for olefin polymerization according to claim 2, wherein the

TABLE 1

|  | Catalyst composition | Catalyst activity | FR g/10 min. | FRR | Density g/cm$^3$ | CXS wt % |
|---|---|---|---|---|---|---|
| Comparative Example 1 | $Mg_{14.9}TiCl_{14.9}[OR]_{17.0}$ | Polymer could not be collected | | | | |
| Comparative Example 2 | $Mg_{3.4}TiCl_{11.5}$ | 160,000 | 1.93 | 48.0 | 0.9015 | 25.2 |
| Example 2 | $Mg_{9.2}TiCl_{21.3}[Py]_{1.1}$ | 116,000 | 1.29 | 25.6 | 0.9164 | 11.9 |
| Example 3 | $Mg_{6.8}TiCl_{18.4}[Py]_{1.4}$ | 389,000 | 0.68 | 30.7 | 0.9198 | 4.9 |
| Comparative Example 3 | $Mg_{17.9}TiCl_{17.9}[OR]_{20.9}$ | Polymer could not be collected | | | | |
| Comparative Example 4 | $Mg_{2.7}TiCl_{19.9}$ | 105,000 | 1,73 | 33.0 | 0.9182 | 15.2 |
| Example 5 | $Mg_{2.6}TiCl_{16.7}[Py]_{1.2}$ | 84,000 | 0.82 | 25.7 | 0.9208 | 6.8 |
| Example 6 | $Mg_{2.6}TiCl_{16.7}[Py]_{1.2}$ | 87,000 | 0.52 | 31.6 | 0.9208 | 4.9 |

What is claimed is:

1. A method for preparing a solid catalyst component for olefin polymerization consisting of reacting a solid catalyst component precursor (D) containing Mg, Ti and OR group (wherein R represents a hydrocarbon group having 1 to 20 carbon atoms) with:

solid catalyst component precursor (D) is a solid product obtained by reduction of an alkoxy titanium compound represented by the general formula $Ti(OR^1)_aX_{4-a}$ (R is a hydrocarbon group having 1 to 20 carbon atoms, X is a halogen atom, a is a number satisfying an inequality $0 < a \leq 4$)

with an organomagnesium compound in the absence or presence of an organic silicon compound having an Si—O bond.

4. A method for preparing a solid catalyst component for olefin polymerization according to claim 2, the reduction is carried out in the presence of an organic porous polymer having an average particle size of 5 to 1000 μm and a micro pore volume for a micro pore radius of 100 to 5000 A of not less than 0.1 cc/g as a carrier thereby fixing the solid catalyst component precursor (D) on the carrier.

5. A method for preparing a solid catalyst component for olefin polymerization according to claim 1, wherein the electron donative compound is an ether compound.

6. A method for preparing a solid catalyst component for olefin polymerization according to claim 1, wherein the solid catalyst composition formulated by the composition formula $Mg_mTix_p[Py]_q$ (X is a halogen atom, Py is a cyclic organic nitrogen compound (C), m, p and q are numbers satisfying inequalities $1 \leq m \leq 51$, $5 \leq p < 106$, $0.1 \leq q \leq 10$ and m <p).

7. A solid catalyst component for olefin polymerization prepared by the method of claim 1.

8. A catalyst for olefin polymerization consisting of:
 (I) a solid catalyst component (A) is prepared by reacting a solid catalyst component precursor (D) containing Mg, Ti and OR group (wherein R indicates a hydrocarbon group having 1 to 20 carbon atoms) with a mixture of a cyclic organic nitrogen compound (C) and a titanium compound (E) having at least one Ti-halogen bond or a mixture of a cyclic organic nitrogen compound (C), a titanium compound (E) having at least one Ti-halogen bond and an electron donative compound, or with a cyclic organic nitrogen compound (C) and a titanium compound (E) having at least one Ti-halogen bond, successively or a cyclic organic nitrogen compound (C) and a mixture of a titanium compound (E) having at least one Ti-halogen bond and an electron donative compound, successively; and
 (II) an organoaluminum compound (B), wherein the cyclic organic nitrogen compound (C) is selected from the group consisting of piperidine, N-methylpiperidine, 2,6-dimethylpiperidine, 3,5-dimethylpiperidine, N-methyl-2,6-dimethylpiperidine, N-methyl-3,5-dimethylpiperidine, 2,2,6-trimethylpiperidine, 2,2,6,6-tetramethylpiperidine, N-methyl-2,2,6,6-tetramethylpiperidine, 2,2,4,6,6-pentamethylpiperidine, 4-acetyloxy-2,2,6,6-tetramethylpiperidine and compounds represented by the following formulae.

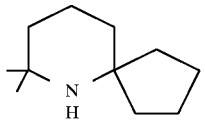

and

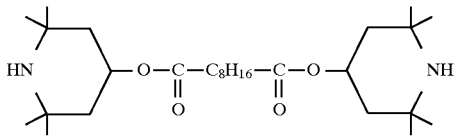

9. A solid catalyst for olefin polymerization according to claim 8, wherein the solid catalyst component precursor (D) is a solid product obtained by reduction of an alkoxy titanium compound with an organomagnesium compound.

10. A solid catalyst for olefin polymerization according to claim 9, wherein the solid catalyst component precursor (D) is a solid product obtained by reduction of an alkoxy titanium compound represented by the general formula $Ti(OR^1)_aX_{4-a}$ ($R^1$ is a hydrocarbon group having 1 to 20 carbon atoms, X is a halogen atom, a is a number satisfying an inequality $0 < a \leq 4$) with an organomagnesium compound in the absence or presence of an organic silicon compound having an Si—O bond.

11. A solid catalyst for olefin polymerization according to claim 9, the reduction is carried out in the presence of an organic porous polymer having an average particle size of 5 to 1000 μm and a micro pore volume for a micro pore radius of 100 to 5000 A of not less than 0.1 cc/g as a carrier whereby fixing the solid catalyst component precursor (D) on the carrier.

12. A solid catalyst for olefin polymerization according to claim 8, wherein the electron donative compound is an ether compound.

13. A solid catalyst for olefin polymerization according to claim 8, wherein the solid catalyst component is represented by the composition formula $Mg_mTix_p[Py]_q$ (X is a halogen atom, Py is a cyclic organic nitrogen compound (C), m, p and q are numbers satisfying inequalities $1 \leq m \leq 51$, $5 \leq p < 106$, $0.1 \leq q \leq 10$ and m<p).

* * * * *